United States Patent [19]
Mizuno et al.

[11] Patent Number: 5,544,130
[45] Date of Patent: Aug. 6, 1996

[54] ELECTRONIC EQUIPMENT OPERATING IN MULTIPLE MODES AND CONTROL METHOD THEREOF

[75] Inventors: Tomoko Mizuno, Chiba; Toshiyuki Takahashi, Tokyo; Hiroshi Yamaguchi, Nagano; Nobuaki Hisamatsu, Tokyo, all of Japan

[73] Assignee: Sony Corporation, Tokyo, Japan

[21] Appl. No.: 289,105

[22] Filed: Aug. 11, 1994

[30] Foreign Application Priority Data

Aug. 18, 1993 [JP] Japan .................................. 5-226373

[51] Int. Cl.$^6$ .................................................. H04B 1/20
[52] U.S. Cl. ..................................... 369/1; 369/2; 369/6
[58] Field of Search ................... 369/1, 2, 3, 4, 369/5, 6, 7, 10, 11, 12, 24; 360/1, 137; 455/344, 345, 346, 347, 348, 349, 351, 150.1, 151.1, 352–355; 340/825.22, 825.24, 825.25

[56] References Cited

U.S. PATENT DOCUMENTS

| | | | |
|---|---|---|---|
| 4,718,112 | 1/1988 | Shinoda | 455/151 |
| 4,864,550 | 9/1989 | Kawanaka | 369/2 |
| 5,130,961 | 7/1992 | Namiki et al. | 369/6 |
| 5,195,065 | 3/1993 | Kato et al. | 369/2 |
| 5,349,575 | 9/1994 | Park | 369/1 |

FOREIGN PATENT DOCUMENTS

| | | | |
|---|---|---|---|
| 4302086 | 7/1993 | Germany | 369/2 |
| 6180975 | 6/1994 | Japan | 369/6 |

*Primary Examiner*—Tan Dinh
*Attorney, Agent, or Firm*—William S. Frommer; Alvin Sinderbrand

[57] ABSTRACT

An electronic equipment controlled by a plurality of operation buttons, for example, for reproducing audio signal of a disc player, an audio tape recorder, a tuner, or an amplifier, etc. provides control circuits. A plurality of operation buttons are composed of: basic operation buttons for basic action of the electronic equipment, such as starting or stopping reproducing of the reproducing unit of a recording medium, music selection, and tuner selection and switching volume adjusting operation of an amplifier; additional function buttons associated with basic operation, such as random reproducing of a reproducing unit of a recording medium, adjusting of equalizing characteristic, and switching adjusting operation of tone quality or sound field, etc.. The control circuits are provided in the electronic equipment, and in the normal operation mode, switches overall operation in response to operation of both basic action and additional function buttons. When the simple operation button is operated, the control circuit switches overall operation mode to simple operation mode to switch overall operation in response to basic operation button, and do not accept operation of additional function buttons.

22 Claims, 7 Drawing Sheets

ELECTRONIC EQUIPMENT OPERATING IN MULTIPLE MODES AND CONTROL METHOD THEREOF

BACKGROUND OF THE INVENTION

1. Field of the Invention

The present invention relates to an electronic equipment and control method thereof, and more particularly, to the electronic equipment which can be operated easily and the method for controlling it.

2. Description of the Related Art

In a conventional audio equipment in which a disc player unit, a tuner unit, and a tape recorder unit are unified, various functions are added to make it convenient to use.

That is, the disc player unit can select reproduction mode, such as program reproduction that performances specified previously by user are reproduced sequentially, repeat reproduction that a desired performance is reproduced repeatedly, and random reproduction. The tape recorder unit can select dubbing or timer recording in cooperation with the tuner unit.

In addition, the amplifier unit switches the operation of a built-in digital signal processor when processing audio signal from the disc player unit, the tape recorder unit, and the tuner unit to output reproduced sounds, thereby various sound fields can be generated and the tone quality can be adjusted freely.

Therefore, the users what are called audiophiles can be satisfied with this kind of audio equipments.

However, if various functions are added to audio equipment, it is impossible to avoid increasing operation buttons like a switch, thereby inexperienced users have difficulty operating such equipment.

More specifically, inexperienced users may not be able to operate such equipment at all.

One solution to this problem is to remove the plural functions to reduce operation buttons in order that inexperienced users can operate easily.

However, if several functions are removed, there is a problem that audiophiles cannot be satisfied because such audio equipments do not have the function they desire.

If these contrary problems are solved, inexperienced users and audiophiles can share such audio equipment, whereby the usability of such equipment is substantially improved.

SUMMARY OF THE INVENTION

It is, therefore, an object of the present invention to provide an electronic equipment which resolves the above-mentioned problem.

It is another object of the present invention to provide a method for controlling an electronic equipment which resolves the above-mentioned problem.

According to the present invention, there provides an electronic equipment including a plurality of operation buttons and a control circuit. A plurality of operation buttons are composed of basic action operation buttons for switching basic operation of electronic equipment, additional function operation buttons for switching additional action associated with basic action, and simple operation buttons. The control circuit is set in the electronic equipment and, in normal operation mode, switches overall action in response to the basic action operation buttons and additional function operation buttons. When the simple operation buttons are operated, the control circuit switches overall operation mode to simple operation mode, and switches overall action in response to the basic action operation buttons, and simultaneously disables the operation of additional function operation buttons.

According to the present invention, there provides a method for controlling the electronic equipment. The electronic equipment has a reproducing unit for reproducing audio signal, and a control unit for controlling reproducing action of the reproducing unit based on the input from the operated operation button among a plurality of operation buttons of an input unit or the operation button for simple operation. By this method for controlling the electronic equipment, the reproducing action of the reproducing unit is controlled by the control unit based on the input from a plurality of operation buttons of the input unit when it is in normal reproduction mode; the reproducing action of the reproducing unit is controlled by the control unit based on the input by the operation button used in simple reproduction mode among a plurality of operation buttons.

According to the present invention, when the operation button for simple operation is operated, the operation mode of the electronic equipment is switched to the simple reproduction mode, and only the input from the operation button for basic action is accepted, therefore even inexperienced users can operate the electronic equipment easily. Further, experienced users can also operate the electronic equipment as desired by switching to the normal operation mode.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
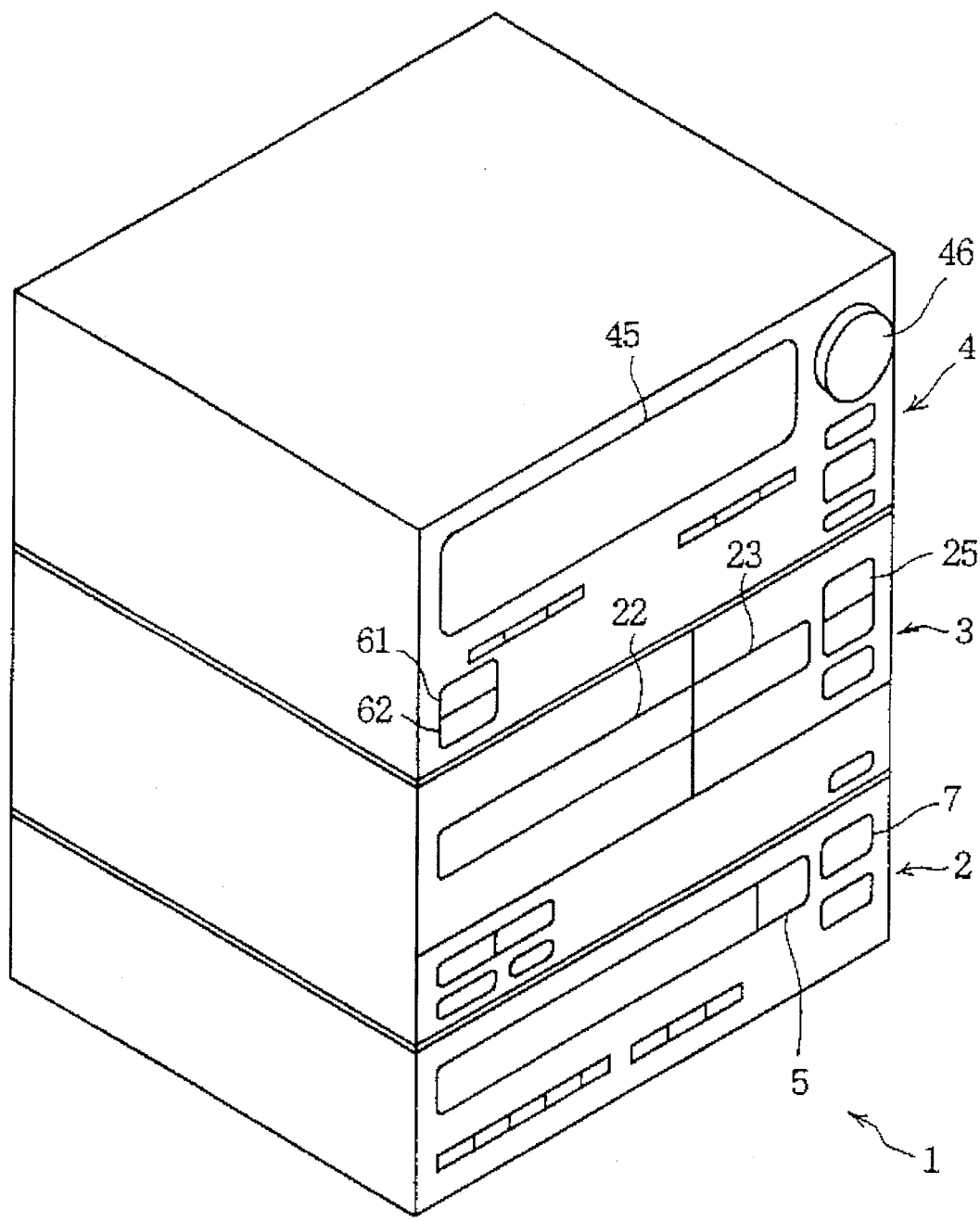
FIG. 1 is a perspective view illustrating audio equipment in accordance with an embodiment of this invention.

Preferred embodiments of the electronic equipment and the controlling method with regard to this invention will be described with reference to the accompanying drawings. An example which the present invention is applied to the audio device will be given below:

In FIG. 1, 1 generally shows an audio device comprised of a disc player unit 2, a tape recorder unit 3, and a tuner and amplifier unit 4.

Figure 2:
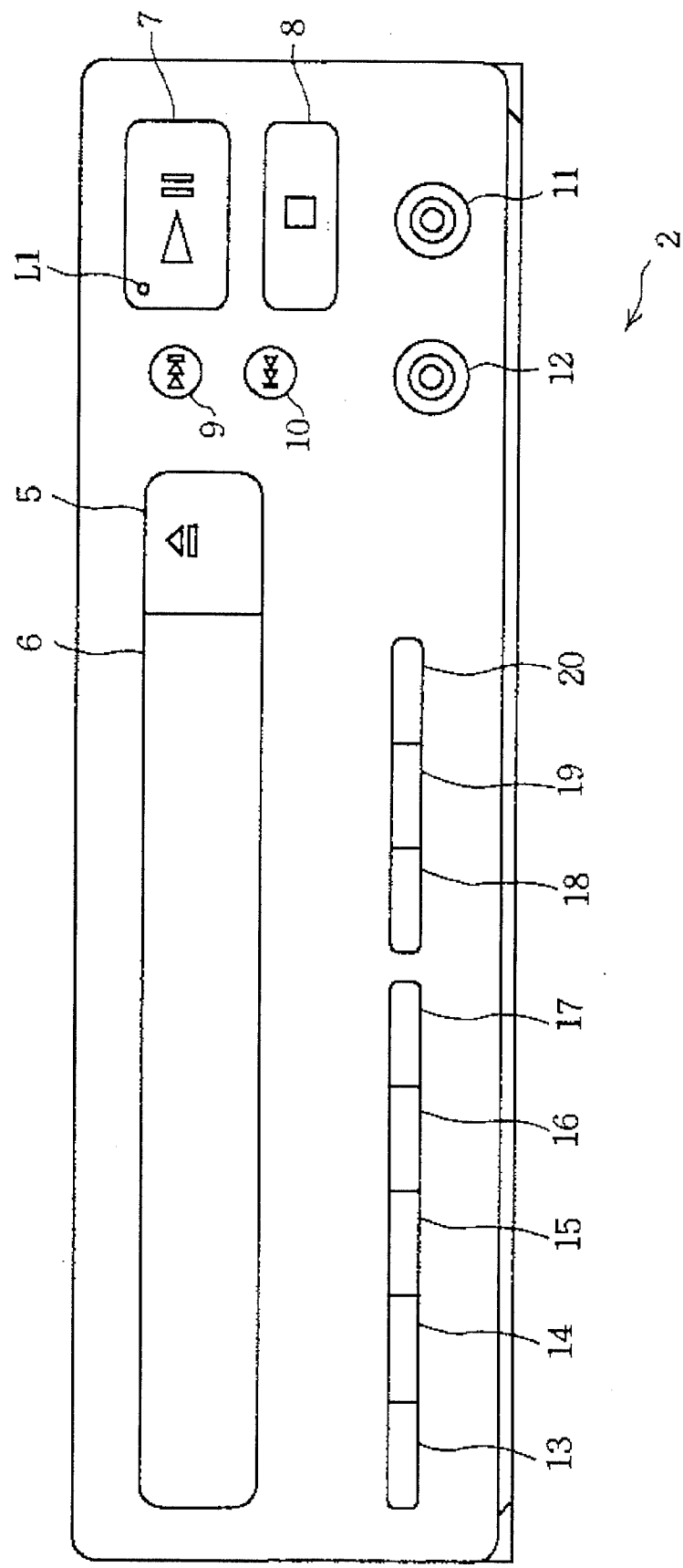
FIG. 2 is a plane view illustrating the arrangement of operation buttons of the disc player unit thereof.

As shown in FIG. 2, in the disc player unit 2, a tray open and close operation button 5 allocated on the front operation panel in front is pressed, so that a switch allocated on the backside of the operation button 5 is switched and a tray 6 is protruded/stored from/to the body of the disc player unit body 2. The operation button 5 is operated to protrude the tray 6 from the disc player unit 2; a disc, such as a compact disc, is placed on the tray 6; the operation button 5 is operated to store the tray 6 into the body of the disc player unit 2; and the disc is conveyed to the position where it can be reproduced by the reproducing unit. Furthermore, when the reproducing action is finished, the operation button 5 is operated again to protrude the tray 6 from the disc player unit 2, so that the disc is conveyed to the position where it can be changed.

The disc player unit 2 also provides a playback operation button 7. The playback operation button 7 is pressed, so that the reproducing action of the disc starts. A switch which is operated by pressing the operation button 7 is allocated on the backside of the operation button 7. The switch operation is performed by operating the operation button 7. The operation buttons described below also have the switches on the backside in the same way. The operation button 7 is pressed, thereby the disc on reproduction can be set to the condition of pause. The operation button 8 to stop a reproduction is allocated below the operation button 7.

Furthermore, in the compact disc player unit 2, search operation buttons 9 and 10 are allocated next to the buttons 7 and 8. When the operation button 9 or 10 is continuously pressed, a desired music is searched in the direction corresponding to the button 9 or 10. Furthermore, when the operation button 9 or 10 is intermittently pressed, the music on playing back can be skipped.

In the disc player unit 2, a headphone jack 11 and a microphone jack 12 are allocated below the operation buttons 9 and 10. A headphone is connected to the headphone jack 11, thereby the user can personally listen to the recorded music. When a microphone is connected to the microphone jack 12, the user can enjoy singing to the music being played back.

In addition to basic action operation buttons 5, 7 to 10 required to operate the disc player unit 2, additional function operation buttons 13 to 20 to switch additional functions are allocated below the tray 6 of the disc player unit 2. Operating these operation buttons 13 to 20, users such as audiophiles can handle these function satisfactorily.

That is, in the normal operation mode, when a continuous playback button 13 is pressed, the disc player unit 2 plays back the recorded musics sequentially from the inner circumference of the disc. On the contrary, when a random playback button 14 is pressed, the disc player unit 2 randomly plays back musics recorded on the disc. Similarly, when a program playback button 15 is pressed in the normal operation mode, a plurality of recorded musics are played back in the order of performances which the user subsequently inputs, whereas, when a repeat playback button 16 is pressed, reproducing action is repeated over and over per one music or per all musics recorded on the disc.

Furthermore, when a performance time operation button 17 is pressed in the normal operation mode, the disc player unit 2 displays on a display unit 45 corresponding to the pressing operation, which elapsed and remaining times of the performance being played back, the elapsed time from the head of the musics recorded on the disc, or the remaining time from the position where it is playing back now to the last recorded position of the last music. When a check operation button 18 is pressed, the operation mode set by the user can be confirmed. Also, when a clear button 19 is operated, this operation mode can be canceled. Provided that, the display unit 45 is composed of liquid crystal element.

Further, in the disc player unit 2, when an edit operation button 20 is pressed, overall action is switched so that the disc can be reproduced in response to the recording action of the tape recorder unit 3.

The additional function operation buttons 13 to 20 are small and aligned below the tray 6, whereas the basic action operation buttons 5, 7 to 10 having thereon symbols for their respective functions are large and all located next to the tray 6 on the right of the front panel. Therefore, the usability of the disc player unit 2 can be improved.

More specifically, whether the user is experienced or not, they have to operate basic action operation buttons 5, 7 to 10 as long as a disc is to be reproduced, and also these operation buttons are very frequently operated.

Thereby, if the basic action operation buttons 5, 7 to 10 are enlarged being given respective symbols thereon and allocated gathered, it prevents from being operated incorrectly. Further, inexperienced users can operate them easily, thereby the usability of the disc player unit 2 can be improved.

In the disc player unit 2, each function of the additional function operation buttons 13 to 20 are displayed by the words printed on the upside panel of respective operation buttons 13 to 20. Therefore, respective operation buttons 13 to 20 are identified easily.

That is, operation buttons 13 to 17 are assigned with the words "CONTINUE," "SHUFFLE," "PROGRAM," "REPEAT," and "TIME," respectively, while operation buttons 18 to 20 are assigned with the words "CHECK," "CLEAR," and "EDIT," respectively.

Figure 3:
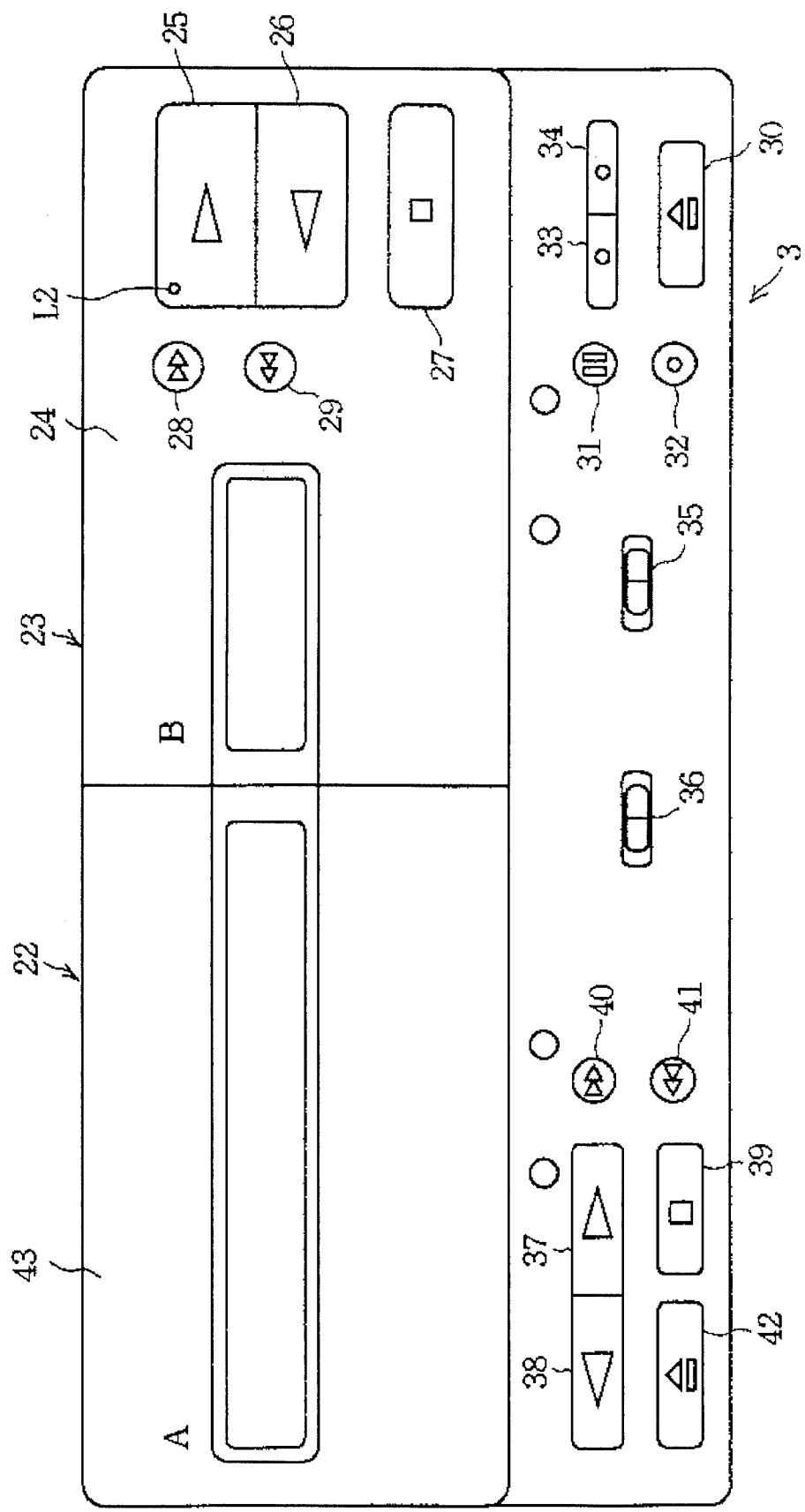
FIG. 3 is a plane view illustrating the arrangement of operation buttons of the tape recorder unit thereof.

As shown in FIG. 3, the tape recorder unit 3 is composed of a reproduction-only tape recorder unit 22 and a recordable and reproducible tape recorder unit 23. In the recordable and reproducible recorder unit 23, which has a higher frequency of use than the reproduction-only tape recorder unit 22, the operation buttons are enlarged.

More specifically, in the recordable and reproducible tape recorder unit 23, the basic action operation buttons 25 to 29 are allocated on the right of front panel 24. When the eject operation button 30 is operated, the overall front panel 24 is opened or closed, thereby the tape cassette can be exchanged.

Therefore, in the tape recorder unit 23, large operation buttons 25 to 29 are allocated in utilizing the area of the front panel 24 effectively. In addition, the button 30 for opening and closing the front panel 24 is located outside the panel 24, thereby the usability of operation buttons 25 to 30 can be improved.

When the playback button 25 or 26 is pressed, the tape recorder unit 3 starts reproduction of the magnetic tape in the direction corresponding to the playback button 25 or 26. Then, when a stop operation button 27 is pressed, the tape recorder unit 3 stops reproducing action.

On the other hand, when a fast-forward or rewind operation button 28 or 29 is pressed, the magnetic tape is fast-forwarded or rewound, and then, when the fast-forward or rewind operation button 28 or 29 is pressed during reproduction, cue action or review action is performed.

The tape recorder unit 23 also has pause and record operation buttons 31 and 32 next to the eject button 30.

Furthermore, in the tape recorder unit 23, the additional function operation buttons 33 and 34 are composed of small operation buttons. Thereby, even the users such as audiophiles can obtain satisfactory usability.

That is, the tape recorder unit 23 accepts the operation of operation buttons 33 and 34 in the normal operation mode. When operation button 33 is pressed, reproduced signal from the tape recorder unit 22 can be executed fast dubbing at the tape recorder unit 23. When the operation button 34 is pressed, audio signal reproduced at the disc player unit 2 is dubbed at the tape recorder unit 23.

The operation button 35 is to switch the equalizing characteristic, and the operation button 36 is to switch the reproduction direction automatically.

Also in the tape recorder unit 23, basic action operation buttons 25 to 30 are enlarged accompanying thereon symbols, and the operation buttons 25 to 29, except for the operation button 30, are located on the right of the front panel 24, so that incorrect operation of the operation buttons can be decreased. Furthermore, inexperienced users can operate them easily.

Consequently, the usability of the tape recorder unit 3 of the audio device 1 can be improved.

On the other hand, in the tape recorder unit 22, small operation buttons 37 to 42 corresponding to operation buttons 25 to 30 are aligned on the lower part of the front panel 43. Thereby, the operation buttons 37 to 42 of the tape recorder unit 22 can be distinguished easily from the operation buttons 25 to 30 of the tape recorder unit 23.

More specifically, in this embodiment, in the tape recorder unit 3, the operation buttons 25 to 29 are located in order that the tape recorder unit 23 with higher frequency of use can be operated priorly. Both tape recorder units 22 and 23 are set operable in the normal operation mode, whereas only the tape recorder unit 23 with higher frequency of use is set operable when simple operation mode is set.

Therefore, in the tape recorder unit 3, only the tape recorder unit 23, one system in two tape recorder units 22 and 23, can be used in the simple operation mode. Furthermore, basic action operation buttons 25 to 30 of the priorly-operated tape recorder 23 are enlarged, so that even inexperienced users can operate the tape recorder easily.

With regard to the additional function operation buttons 33 to 36, words such as "HIGH SPEED DUBBING", "CD SYNCHRO", which show the function of respective operation buttons 33 to 36, are printed on the upside panels of the respective operation buttons 33 to 36 similar to the disc player unit 2.

Figure 4:
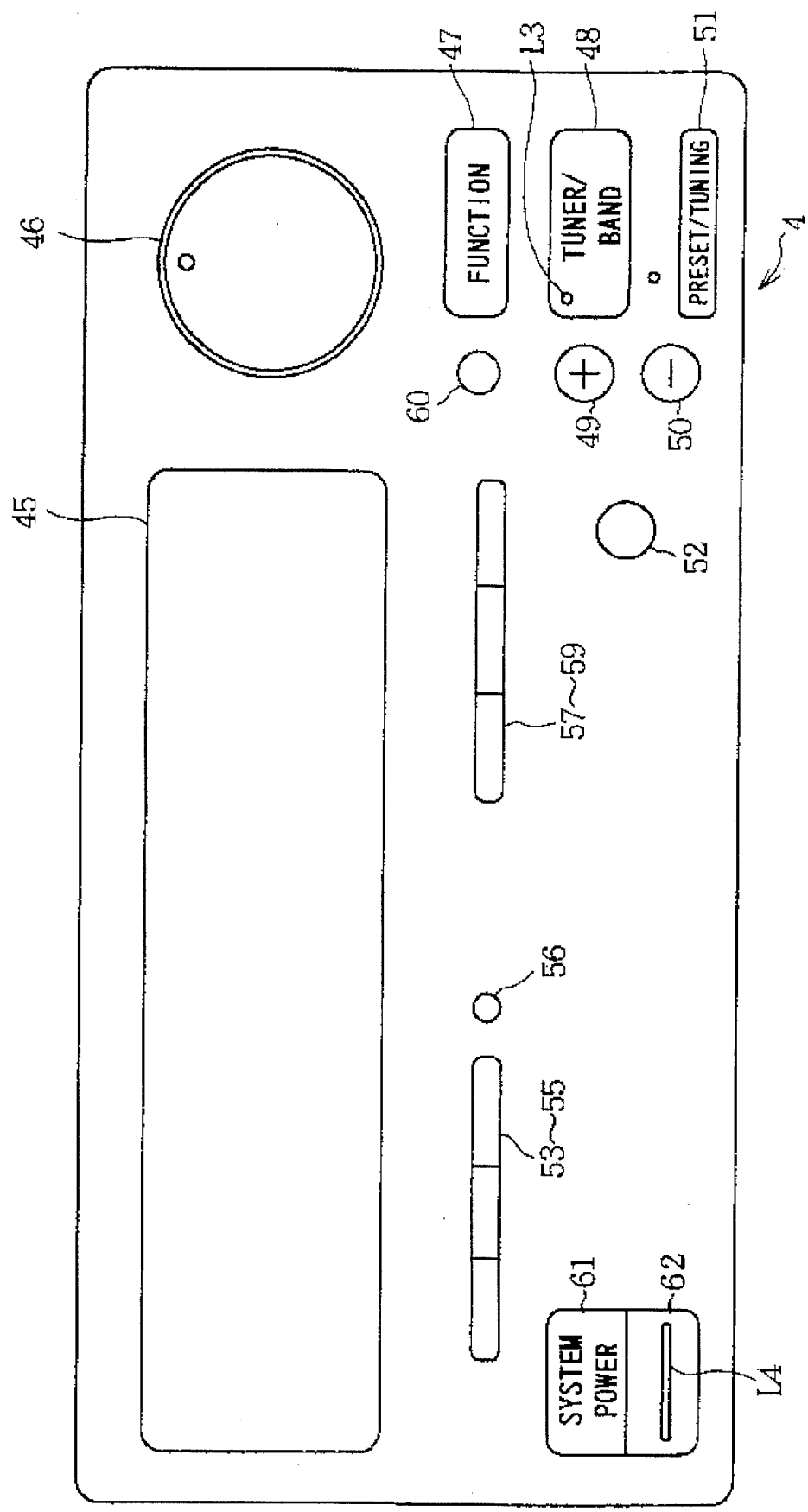
FIG. 4 is a plane view illustrating the arrangement of operation buttons of the tuner and amplifier unit thereof.

As shown in FIG. 4, the tuner and amplifier unit 4 has a large display unit 45 composed of liquid crystal elements on the front face. The display unit 45 displays the operation mode, or the like.

In the tuner and amplifier unit 4, basic action operation buttons, a volume control operation button 46, a source switch operation button 47, and a tuner and band selection operation button 48, are allocated next to the display unit 45 with large size.

The tuner and amplifier unit 4 switches source which sequentially and cyclically outputs audio signal in the order of to the tuner unit, to the disc player unit, and to tape recorder unit in response to pressing operation of the source switch operation button 47.

In the audio device 1, in addition to this function of the source switch operation button 47, when the operation button 7 of the disc player unit 2, the operation button 25 of the tape recorder unit 2, or the tuner and band selection operation button 48 is pressed, source which outputs audio signal corresponding to the respective press-operated operation buttons are switched. Therefore, the usability can be improved.

In the case where the tuner and band selection operation button 48 is pressed, the tuner is turned on in operational condition so that source which outputs audio signal is switched to the tuner. On the contrary, if the tuner has been previously selected as the source, the receiving band is switched by the operation button 48.

Therefore, even inexperienced users can operate easily as regarding the basic action operation buttons of the tuner and amplifier unit 4.

Also in the tuner and amplifier unit 4, the basic action operation buttons 46 and 47 are all located on the right of the front panel. In the audio device 1, thus, the basic action operation buttons of the disc player unit 2, the tape recorder unit 3, and tuner and amplifier unit 4 are enlarged and all located on the right of the console panel.

Thus, in the audio device 1, the basic action operation buttons are located together, so that incorrect operation of the operation buttons can be effectively avoided, and moreover, even inexperienced users can operate the audio device 1 easily.

In the tuner and amplifier unit 4, channel selection operation buttons 49 and 50 are allocated next to the tuner selection button 48. When the operation buttons 49 and 50 are pressed, the preset reception channels are selected sequentially and cyclically to select a radio broadcast. When the operation button 49 or 50 is operated after a preset/tuning operation button 51 is operated, the receiving frequency is made variable. Furthermore, the receiving frequency is set to a desired frequency and a memory operation button 60 is pressed, thereby the receiving channel can be preset.

In the tuner and amplifier unit 4, a bass boost operation button 52 is allocated next to buttons 49 and 50.

In the tuner and amplifier unit 4, additional function operation buttons for operating the amplifier are aligned horizontally in the middle of the front panel. These operation buttons are smaller than the basic action operation buttons.

More specifically, in the tuner and amplifier unit 4, timer operation buttons 53 to 55 are allocated on the left of the front panel. Timer recording can be executed by operating these operation buttons 53 to 55. In addition, the current time, etc. can be set by operating a clock set operation button 56 next to operation buttons 53 to 55.

In the tuner and amplifier unit 4, the operation buttons 57 to 59 for the adjustment of tone quality, sound field, etc. are allocated. By operating these operation buttons, audio signal can be listened with a desired tone quality or other effect.

As described above, also in the tuner and amplifier unit 4, the basic action operation buttons are enlarged and simultaneously the additional function operation buttons are miniaturized, so that, in the audio device 1, the operation buttons can be identified easily. Therefore, the usability can be improved as a whole.

Further, in the tuner and amplifier unit 4, a large power switch 61 is allocated on the left of their front panel. By operating this power switch 61, overall system power is turned on.

Moreover, in the tuner and amplifier unit 4, a simple operation button 62 as large as the switch 61 is allocated adjacent to under side of the power switch 61. By operating the operation button 62, overall operation mode can be switched to simple operation mode.

Hence, in the audio device 1, power and simple operation buttons 61 and 62 which are most basic are formed of large operation buttons, and allocated below the display unit 45, most noticeable point, which is on the left of the console panel opposed to the side where the other basic action operation buttons are allocated, so that inexperienced users can visually confirm power and simple operation buttons 61 and 62 with ease. Therefore, the usability of the overall audio device 1 can be improved.

On the additional function operation buttons 52 to 60, words such as "DEFB", "TIMER SET", "DAILY", "REC TIMER", "CLOCK SET", "KARAOKE", "EFFECT", and "EQ PRESET", etc. are printed. Thus, in the tuner and amplifier unit 4, respective operation buttons 52 to 60 can be identified easily.

Figure 5:
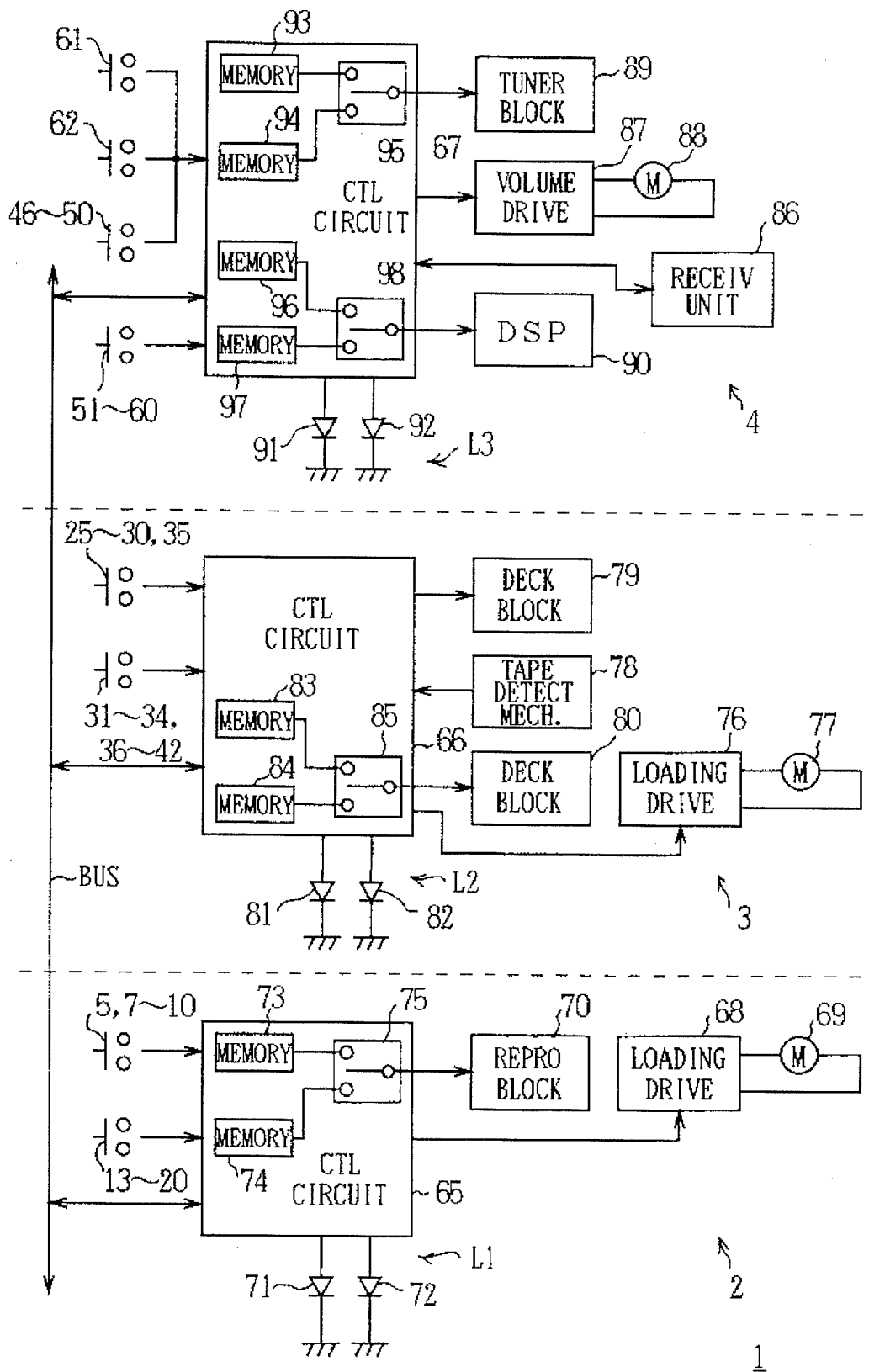
FIG. 5 is a block diagram explaining overall control of the audio equipment.

As shown in FIG. 5, in the audio device 1, the disc player unit 2, the tape recorder unit 3, and the tuner and amplifier unit 4 have control circuits 65, 66, 67 composed of microcomputer, respectively. The control circuits 65, 66, 67 control the respective sections 2, 3, 4. The control circuit 67 controls the control circuits 65 and 66 to control overall operation. Therefore, in the control circuits 65, 66, 67, control data is transmitted and received from each other via a predetermined bus "BUS".

In the normal operation mode, the control circuit 65 of the disc player unit 2 controls the operation of the disc player unit 2, based on control data outputted from the control circuit 67 and also in response to the basic action operation buttons 5, 7 to 10 and the additional function operation buttons 13 to 20.

More specifically, when the tray open and close operation button 5 is pressed, the control circuit 65 outputs control data to a loading drive circuit 68 to drive a loading motor 69, thereby moving the tray 6 to the inside and outside of the disc player unit body. Therefore, the tray 6 is stored to convey the disc placed on the tray 6 to the position where the disc can be reproduced, or the tray 6 is protruded to convey the disc to the position where it can be changed.

When the tray 6 is stored into the body of the disc player unit 2, the control circuit 65 then outputs control data to a reproducing block 70 to read out a TOC data from the disc to memorize in the memory, etc..

More specifically, the control circuit 65 rotationally drives a spindle motor which composes the reproducing block 70, thereby rotationally driving the disc to a constant linear velocity.

Then, the control circuit 65 drives a thread motor which composes the reproducing block 70 to move an optical pickup to a lead-in area formed on the inner circumference of the disc, and then starts a focus search.

The optical pickup irradiates a light beam emitted from a laser diode via an objective lens, and simultaneously receives the returned beam which is the reflected light of the light beam via this objective lens by means of a specified light-receiving element. Therefore, the reproducing block 70 generates a reproduction signal, a focus error signal, and a tracking error signal based on the output signal of the light-receiving element.

The reproducing block 70 thus obtains the audio signal by processing the reproduction signal, and moves the objective lens in the directions of focus and tracking, based on the focus error signal and the tracing error signal to focus control and tracking control.

During a focus search process, the control circuit 65 monitors the focus error signal while making the objective lens of the optical pickup approach the disc gradually from the initial set position. Thereby, after the level of the focus error signal has risen or fallen, the focus servo loop is closed to start focus servo, at the timing of acrossing "0" level.

The control circuit 65 then detects the position of the objective lens which light beam emitted from the laser diode can be focused on the signal recording surface of the disc, and sets this position as the center of focus control.

Once a focus search has been finished in this manner, the control circuit 65 then starts to tracking control to start reading out of the lead-in area.

The control circuit 65 takes in the reproducing data sequentially outputted from the reproducing clock 70 to store the TOC data recorded in the lead-in area in specified memory. The performance time, the number of musics, the recording position, etc. of the audio signal recorded on the disc can be obtained based on this TOC data.

In response to subsequent operation of buttons 5, 7 to 10, 13 to 20, the control circuit 65 outputs control data to the reproducing block 70 in order to start reproducing process of audio signals. In this case, the circuit 65 performs processes such as program reproduction, random reproduction on the basis of the TOC data stored in memory, so that performances that the user desire can be reproduced freely.

In the normal operation mode, the control circuit 65 accepts additional function operation buttons 13 to 20 in addition to basic action operation buttons 5, 7 to 10. Thereby, processes such as program and shuffle reproduction, can be performed. In the simple operation mode, the control circuit 65 only accepts basic action operation buttons 5, 7 to 10. Thus, even inexperienced users can operate the disc player unit 2 easily in the simple operation mode.

More specifically, usability can be improved with these additional functions for experienced users such as audiophiles, whereas inexperienced users have difficulty operating these functions because the operation buttons are increased.

In this embodiment, when overall operation mode is switched to simple operation mode by being controlled by the control circuit 67, the control circuit 65 avoids accepting operation of additional function operation buttons 13 to 20. Therefore, usability for inexperienced users can be improved.

When the playback operation button 7 is pressed after the TOC data is stored in memory, the control circuit 65 drives the reproducing block 70 to start reproduction of the disc. If operation buttons 7, 8 are then operated on this condition, the circuit 65 pauses reproducing action and stops it.

When the operation button 7 is pressed to start reproduction, the control circuit 65 determines whether a disc is present based on the result of a focus search. If it is judged that the disc is not present, the control circuit 65 moves the tray 6 to protrude from the disc player unit 2 without starting reproducing action in the same case as the tray open and close button 5 is pressed.

More specifically, if a compact disc is not present, the optical pickup does not receive reflected light and thus no focus error signal can be detected. The control circuit 65 can perform a focus search in advance so as to detect whether or not the disc is present on the tray 6, that is, the presence of the disc.

Therefore, in the case where the user operates the playback start button 7 despite the absence of a disc, the disc player unit 2 protrudes the tray 6 from the disc player unit body so as to prompt the user to put a compact disc. Thereby, usability can be improved.

On the contrary, if reproduction is started in response to pressing operation the operation button 7 in the simple operation mode, the display of the operation button 7 is switched from orange to green by the control circuit 65.

That is, in this embodiment, the operation button 7 has a light emitting diode L1 in its upper left corner. This light emitting diode is composed of diode chips 71 and 72 with orange and green luminescent colors stored respectively.

In the simple operation mode, when the operation button 7 is ready to reproduce the disc, the control circuit 65 drives the orange diode chip 71 to light to show the operation button 7 in orange. On the other hand, in the case where the operation button 7 is operated and the compact disc is being reproduced, that is, the operation button 7 is ready to pause reproduction, the control circuit 65 drives the green diode chip 72 instead of the orange diode chip 71 to light to show the operation button 7 in green.

Thereby, even inexperienced users can select and operate the operation button 7 easily by selecting simple operation mode. The usability thus can be improved.

When the operation button 7 is lighted to show, after the simple operation mode is started up, the control circuit 65 drives the diode chip 71 in order to keep this orange light 71 blinking for a predetermined time.

Consequently, the user can easily identify the basic action operation button 7 which can be operated after the operation mode is started up to simple operation mode. The usability of the disc player unit 2 thus can be improved.

Since the control circuit 65 does not accept the operation of additional function operation buttons 13 to 20 in the simple operation mode, even inexperienced users can operate the system easily and the usability of the system thus can be improved.

In the normal operation mode, the control circuit 65 retains in specified memory the operation status of additional function operation buttons 13 to 20 set by the user. Thus, when the disc player unit 2 is then started in the normal operation mode, the operation condition set by the user is reproduced.

In the case where the user operates the operation button 17 to display the remaining time of the performance being played back, the disc player unit 2 retains this status in memory. And then, when power is turned on in the normal operation mode, the remaining time of this performance can be displayed in the display unit 45.

Consequently, since the operation status is retained in the memory, the disc player unit 2 can reproduce the operation status desired by users without operating the operation buttons 13 to 20 whenever power is turned on, thereby further improving usability.

On the other hand, when the simple operation mode is entered, the control circuit 65 records in a first memory 73 the data stored in the above memory, then switches the contact of the selection circuit 75 to a memory 74, so that the disc player unit 2 is set to the preset operation status, based on the control data memorized in the memory 74.

The memory 74 stores data for additional function operation buttons 13 to 20. Therefore, when the operation button 7 of the disc player unit 2 is pressed, a plurality of musics recorded on the disc are reproduced in the order of performances recorded on the disc. Simultaneously, the elapsed time of the performance being played back is displayed on the display unit 45.

Therefore, the disc player unit 2 can provide minimum required time data for performance during simple operation mode, even if an inexperienced user operates. The disc player unit 2 also plays back the disc in the order of performances displayed on the index card stored in the case, so that the user can be operate the disc player unit 2 without feeling uneasy.

When overall operation mode is switched to simple operation mode, then again to normal operation mode, the control circuit 65 switches the contact of the selection circuit 75 to the first memory 73. The disc player unit 2 is started up based on the control data memorized in the memory 73, in order to reproduce the operation status set in the normal operation mode.

Consequently, with the compact disc player 2, if, for example, a mother who is inexperienced in operation and an audiophile child share the audio device 1, the mother can operate the device 1 without disturbing the operation status set by the child. Usability of the audio device 1 is thus improved.

The mother can also listen to discs with a preset operation status without executing any complicated operation. She can thus enjoy listening to discs by simple operation.

The audio device 1 is so composed that remote control signal outputted from a remote commander can be received at the receiving unit 86 of the tuner and amplifier unit 4. The receiving result is obtained at the disc player unit 2 via the control circuit 67, and then the action is switched based on this receiving result.

The operation buttons similar to those of the disc player unit 2 are allocated on the remote commander. Also the light-emitting diode of the operation button of the remote commander corresponding to the operation button 7 is driven based on display switching control signal from the control circuit 67.

The disc player unit 2 switches its overall operation mode between normal and simple operation modes based on the operation of the remote commander similar to the case where the button of the player 2 is operated. Furthermore, the disc player unit 2 drives the light-emitting diode of the operation button of the remote commander which is corresponding to a light-emitting diode L1, via the control circuit 67. Consequently, even when remote control is performed via the remote commander, usability can be improved for both experienced and inexperienced users.

In the normal operation mode, the control circuit 66 of the tape recorder unit 3 controls the operation of the tape recorder unit 3 based on control data outputted from the control circuit 67, and the basic action operation buttons 25 to 30 and the additional function operation buttons 31 to 42.

That is, when the eject operation button 30 or 42 is pressed, the control circuit 66 outputs control data to a loading drive circuit 76 to drive a loading motor 77, thereby moving a front panel 24 or 43 corresponding to operation of the operation button 30 or 42, respectively. The front panel 24 or 43 is thus closed to keep the tape cassette ready for reproduction, or the front panel 24 or 43 is opened to be able to replace the tape cassette ready for reproduction.

In the case where the front panel 24 or 43 is closed, the control circuit 66 sequentially outputs control data to a tape detection mechanism 78 so as to determine whether or not a tape cassette is present.

In this embodiment, the tape detection mechanism 78 is allocated in the cassette holder settled in the front panels 24 and 43, and composed of the switch operated by the tape cassette put in the cassette holder. This switch is not only limited to the one which a contact is opened and closed mechanically but detection is performed optically. When the front panel 24 or 43 is closed with a tape cassette put into, the signal from this switch is supplied to the control circuit 66.

In the tape recorder unit 3, it is determined whether or not a tape cassette is present based on the output signal from this switch.

When detection action of a tape cassette has been completed, the control circuit 66 outputs control data to a deck block 79 or 80 based on subsequent operation of operation buttons 25 to 42 to start recording and reproducing action.

In the normal operation mode, the control circuit 66 accepts operation of additional function operation buttons 31 to 42 regard of the tape recorder unit 22 addition to basic action operation buttons 25 to 30. Thereby, operations such as fast dubbing can be performed.

On the other hand, in the simple operation mode, the control circuit 66 selectively accepts only operation of basic action operation buttons 25 to 30 of the tape recorder 23. Therefore, only the tape recorder unit 23 can be operated. In addition, the tape recorder unit 23 is prevented from switching to record mode.

More specifically, the ability to select from multiple operation modes solves the problem caused by the availability of additional functions such as fast dubbing desired by the audiophiles, but disquieting to inexperienced users because it makes the operation of the device more difficult for them.

The problem, which using two tape recorder units 22 and 23 may make operation complicated and difficult for such inexperienced users, can be solved.

This is because that it may be sufficient for inexperienced users to be able to use only one of two tape recorder unit.

In this embodiment, once overall operation mode is controlled by the control circuit 67 and switched to simple operation mode, the control circuit 66 does not accept operation of the additional function operation buttons 31 to 34 and the operation buttons 36 to 42 of the tape recorder 22. Therefore, even inexperienced users can operate the tape recorder easily.

More specifically, when the playback operation button 25, 26, 37, or 38 is pressed, the control circuit 66 drives the corresponding deck block 79 or 80 to start recording and reproducing of the tape cassette. If the button 27 or 39 is then operated on this condition, reproduction is stopped.

When the operation button 25, 26, 37, or 38 is pressed to start reproduction, the control circuit 66 determines whether or not a tape cassette is present based on the detection result of the tape detection mechanism 78. In the case where the operation button 25, 26, 37, or 38 is pressed, one of the tape recorder unit 22 or 23 in which a tape cassette is not present drives the loading drive circuit 76 to open the front panel 24 or 43 in the same way as the corresponding eject operation button 30 or 42 is pressed.

Thus, in the tape recorder unit 3, if the user operates the operation button 25 or 26 despite the absence of a tape cassette, the front panel 24 or 43 is opened so as to prompt the user to put a tape cassette into the cassette holder, thereby usability can be improved.

On the other hand, in the simple operation mode, when reproducing action is started based on pressing the operation button 25 on the tape recorder 23, the control circuit 66 switches the lighting display of the operation button 25 from orange to green.

More specifically, in this embodiment, the operation button 25 has the light-emitting diode L2 allocated on the upper left corner of the operation button 25. The light-emitting diode L2 is so composed that light-emitting diode chips 81 and 82 with orange and green luminescent colors are stored respectively.

In the simple operation mode, when the operation button 25 is ready to reproduce the tape cassette in the tape recorder unit 23, the control circuit 66 drives the orange light-emitting diode chip 81 to light the operation button 25 in orange. On the other hand, in the same mode, when the tape cassette is reproduced through operation of the operation button 25, the control circuit 66 drives the green light-emitting diode chip 82 instead of the orange light-emitting diode chip 81 to light the operation button 25 in green.

Since even inexperienced users can easily select and operate the operation button 25 selecting simple operation mode, the usability of the tape recorder unit 3 can be thus improved.

Furthermore, in the tape recorder unit 3, since only one playback button 25 is provided with a light-emitting diode L2 and lighted in orange, inexperienced users can easily identify playback button 25 without being confused.

More specifically, in this embodiment, the tape recorder unit 23 accepts any operation of the operation buttons 25 and 26 even if simple operation mode is selected, thereby playing back the magnetic tape in the direction corresponding to operation button 25 or 26.

Therefore, users who is familiar with audio equipment operation can select the operation button 25 or 26 to reproduce the magnetic tape in the simple operation mode. If inexperienced users cannot operate the operation button 25 to play back a desired performance, the users can stop the reproducing operation, reverse the direction of the tape cassette, and then press the operation button 25 again, so that desired performance can be played back. Therefore, confusion can be avoided effectively to play back the desired performance without fail.

When the operation button 25 is lighted, the control circuit 66 drives the light-emitting diode chip 81 to keep orange color display blinking for a specified period of time soon after that simple operation mode is entered.

Consequently, after simple operation mode is entered, the user can easily identify the basic action operation button 25 that can be operated sequentially.

Since the control circuit 66 does not accept the operation of additional function operation buttons 31 to 34 and the operation buttons 36 to 42 with regard to the tape recorder unit 22 in the simple operation mode, even inexperienced users can operate the tape recorder unit easily and usability can be thus improved.

In the normal operation mode, the control circuit 66 performs fast-forwarding or rewinding reproduction if the operation button 28 or 29 is pressed during reproduction. On the contrary, in the simple operation mode, the control circuit 66 controls the deck block 79 to stop reproduction and simply fast-forwards or rewinds the magnetic tape. Therefore, convenience of inexperienced users is preferred to accessibility of less important functions and overall usability is improved.

Furthermore, in the normal operation mode, the operation status corresponding to operating additional function operation buttons 35 and 36 set by the user is memorized in specified memory by the control circuit 66. Therefore, this status can be reproduced based on the memorized data when the tape recorder unit 3 subsequently starts operation in this normal operation mode.

If, for example, the user operates the operation button 35 to set the equalizing characteristic to a specified value or operates the operation button 36 to set the reproduction direction for only one side of the tape cassette, this status is memorized in the memory. Subsequently when power is turned on, the operation status can be reproduced based on the data memorized in memory without operation of the button 35 or 36. Therefore, usability can be improved.

On the contrary, when simple operation mode is entered, the control circuit 66 records the data stored in the memory in first memory 83, then switches the contact of the selection circuit 85 to memory 84 side, so that the tape recorder unit 3 is set to the operation status corresponding to the control data previously memorized based on this control data.

Here, initial value data for additional function operation buttons 35 and 36 is stored in the memory 84. Therefore, when the operation button 25 is pressed, the control circuit 66 plays back the tape cassette with the preset equalizing characteristic, and simultaneously controls the deck block 80 to reproduce both sides of the tape cassette continuously.

Thereby, inexperienced users can operate the tape recorder unit 3 easily in the simple operation mode.

On the other hand, when overall operation mode is switched to simple operation mode, then again to normal operation mode, the control circuit 66 switches the contact of the selection circuit 85 to memory 83 so as to turn the operation of the tape recorder unit 3 on based on the data stored in the memory 83. Therefore, the operation status of the tape recorder unit 3 set in the normal operation mode can be reproduced.

Consequently, with the tape recorder 3, if, for example, a mother who is inexperienced in operation and an audiophile child share the audio device 1, the mother can operate the audio device 1 without disturbing the operation status set by the child. As a result, the usability of the audio device 1 can be improved. Furthermore, the mother can reproduce tape cassette with a preset operation status without executing complicated operation.

In addition, similar to the disc player 2, the tape recorder unit 3 can receive a remote control signal outputted from the remote commander via the control circuit 67, so that operation can be switched in response to the receiving result.

The operation buttons similar to the tape recorder unit 3 are allocated on the remote commander. The light-emitting diode of the operation button of the remote commander corresponding to the operation button 25 is driven in response to a display switching control signal outputted from the control circuit 67.

The tape recorder unit 3 switches the overall operation between normal and simple operation modes based on operation of the remote commander similar to the operation buttons of the recorder unit 3 being operated. Then, the tape recorder unit 3 switches the display color of the operation button of the remote commander corresponding to the operation button 25 via the control circuit 67. Consequently, if the remote control is performed via the remote commander, usability can be improved for both experienced and inexperienced users.

The control circuit 67 for the tuner and amplifier unit 4 controls the overall operation of the audio device based on operation of the operation buttons 46 to 62 and the operation of the remote commander received via the receiving section 86, and simultaneously controls the operation of the tuner and amplifier unit 4.

Figure 6:
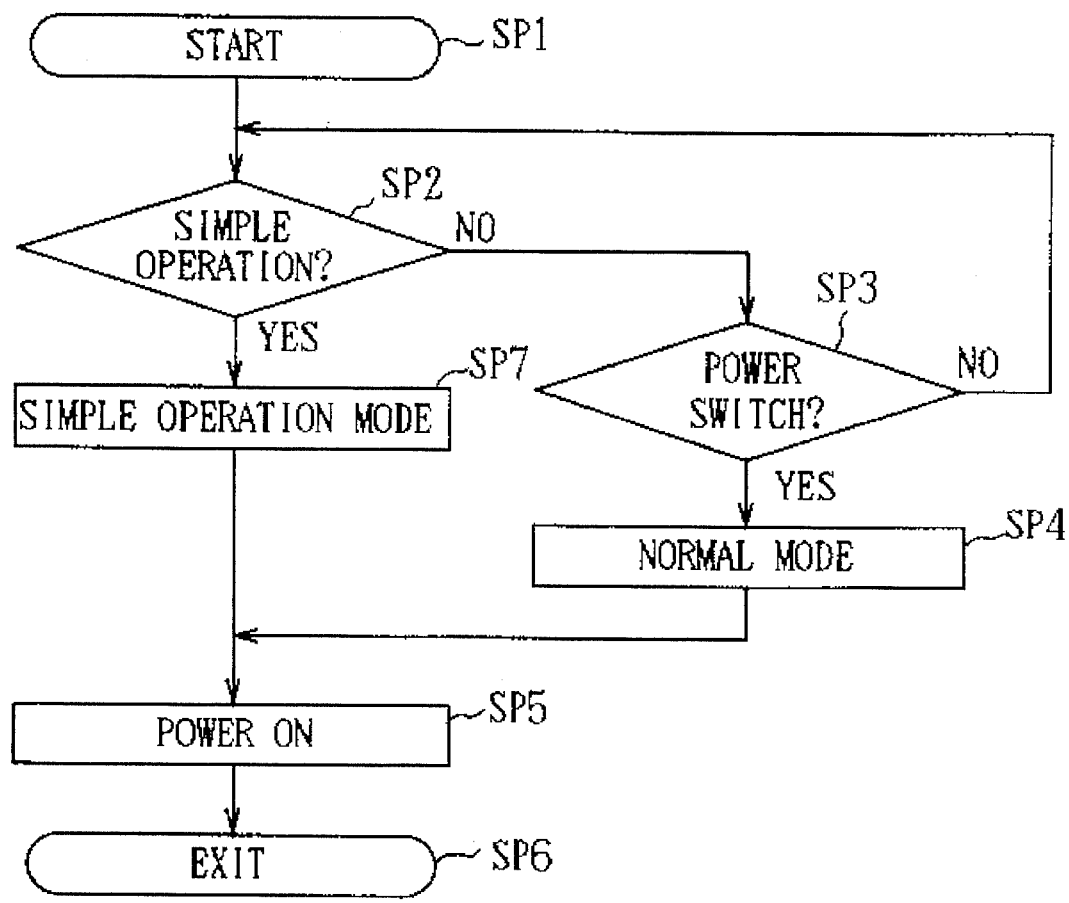
FIG. 6 is a flowchart explaining turning on power.

At step SP3, the control circuit 67 thus executes the processing shown in FIG. 6 to turn overall power on when the power switch 61 or the power switch of the remote commander is pressed under the power-off condition.

That is, the control circuit 67 proceeds from step SP1 to SP2 to determine whether or not the operated operation button is the simple operation button 62 or the simple operation button of the remote commander. If the result is negative, the control circuit 67 proceeds to step SP3.

The control circuit 67 determines whether or not the operated operation button is the power switch 61 or the power switch of the remote commander. If the negative result is obtained, the control circuit 67 returns to step SP2, thereby, repeating sequential processing of steps SP2—SP3—SP2. If the affirmative result is obtained at step SP3, the control circuit 67 proceeds to step SP4.

At step SP4, the control circuit 67 sets overall operation mode to normal operation mode, and proceeds to step SP5 to turn power on, and then proceeds to step SP6 to terminate the process.

Therefore, the audio device 1 can turn on power in the normal operation mode, enabling audiophiles to obtain access to their desired additional functions.

When operation is started in normal operation mode, similar to the control circuits 65 and 66, the control circuit 67 sets the operation status of a tuner block 89 and a DSP (digital signal processor) 90 based on the operation status data stored in specified memory. Thereby the operation status set by the user can be reproduced in the normal operation mode, similar to the disc player unit 2 and the tape recorder unit 3

On the other hand, when power is turned on in normal operation mode after entering simple operation mode, the control circuit 67 sets the operation status of the tuner block 89 and digital signal processor 90 based on the data stored in the above memory and data stored in the memory 93 and 96. The control circuit 67 thereby reproduces the operation status set by the user in the normal operation mode, similar to the disc player unit 2 and tape recorder 3.

More specifically, in the control circuit 67, the specified data of operation status data set in the normal operation mode is memorized in the memory 93 and 96 when simple operation mode is started up.

In the memory 93, the data for the receiving band selected by the user operating the button 48, the data of receiving channel selected by operating the operation button 49 or 50, the data whether or not the receiving channel is preset by operation of the operation button 51, and the data whether or not receiving was performed in normal mode are memorized. As a result, the data showing the operation status of the tuner block 89 is stored in the memory 93.

On the contrary, in the memory 96, the data for the sound field, tone quality, bass boost level, operation quantity of the volume control operation button 46, and operation quantity of the operation button 47, which is all set by the user operating buttons 52, 57 to 59, are memorized. As a result, the data showing operation status for the digital signal processor 90 and volume quantity control operation button 46 is stored in the memory 96.

When power is turned on in normal operation mode after entering simple operation mode, the control circuit 67 switches the contacts of selection circuits 95 and 98 to output data from memory 93 and 96 to the tuner block 89 and the digital signal processor 90, thereby operation status is reproduced. The control circuit 67 further outputs this data to a volume driving circuit 87 to drive the motor 88 rotationally, thereby rotating the volume control 46 to replicate that last volume setting.

Consequently, in the audio device 1, the last operation status used by the user in the normal operation mode can be reproduced without operating various operation buttons whenever power to the overall audio device 1 is turned on.

Therefore, complicated operation is eliminated and overall usability can be improved.

In this embodiment, when the simple operation button 62 or the simple operation button of the remote commander is pressed while the power is off, the control circuit 67 turns power on similar to the power switch 61 or the power switch of the remote commander being pressed.

More specifically, the control circuit 67 proceeds from step SP1 to SP2 similar to the power switch of the remote commander being pressed. Since the affirmative result is obtained, the control circuit 67 proceeds to step SP7.

The control circuit 67 switches overall operation mode to simple operation mode, then proceeds to step SP5 to turn power on.

The audio device 1 therefore can turn power on by simply pressing the simple operation button 62 allocated next to the switch 61, instead of the power switch 61. Even users inexperienced in operation of audio equipment can thus turn power on easily.

When power is turned on in simple operation mode, the control circuit 67 writes operation status of the normal operation mode retained in memory 93 and 96, and then switches contacts of selection circuits 95 and 98 to memory 94 and 97.

The control circuit 67 thereby reproduces the operation status set in the simple operation mode, referring the operation status data for simple operation mode stored in memory 94 and 97.

The data regarding operation status corresponding to memory 93 and 96 is stored in memory 94 and 97, respectively. The control circuit 67 controls memory 97 to memorize only the data of operation quantity of the operation button 46 among the data showing operation status. Therefore, the operation status is set with preset initial value data with regard to the remaining data such as sound field and tone quality.

Hence, when simple or normal operation mode is started up, the operation status set in each simple or normal mode is reproduced by the control circuit 67. Thus, if, for example, a mother and her child share the audio device 1, also regarding the tuner and amplifier unit 4, the mother or her child can reproduce the original operation status to operate without making any changes to the operation status set by the mother or the child.

In addition, in the simple operation mode, the operation status are set with preset initial value data for effects such as sound field and tone quality. As a result, complicated operation of operation buttons can be simplified and audio signal can be heard with a standard sound field and tone quality. Therefore, usability can be improved.

When power is turned on in simple operation mode, the control circuit 67 cancels timer starting operation mode if the user has selected this mode.

In timer starting operation mode, the audio device 1 starts up when the time set by the user has come. Hence, it can be judged that the audio device 1 needs not be started up at the time set by the user in the case where power is turned on by operation of the simple operation button 62.

With this audio device 1, it is considered that no receiving channel may be preset. In such a case, it is difficult to select last receiving channel automatically when operation mode is returned from the simple operation mode to the normal operation mode.

That is, when the operation button 48 is operated, the control circuit 67 starts up the tuner block 89, or switches the receiving band if the tuner block 89 has already been started up on the operable condition.

The control circuit 67 further switches the receiving channel of the tuner block 89 sequentially and cyclically within a range of preset receiving channels based on operation of the operation button 49 or 50. On the contrary, the receiving frequency of the tuner block 89 is varied sequentially when operation button 51 is operated, and then operation button 49 or 50 are operated.

If the memory operation button 60 is then pressed on this condition, the control circuit 67 records the receiving frequency of the tuner block 89 in specified memory, so that receiving channels can be preset.

Thus, when the control circuit 67 starting up to simple operation mode on the condition that receiving channels are preset, it selects one of the channels which has received in the last simple operation mode according to the data stored in memory 94.

On the other hand, when simple operation mode is started up with no receiving channel preset, the control circuit 67 operates the operation buttons 49 or 50 to vary the receiving frequency.

As described above, presetting receiving channels is complicated because the operation buttons 49, 50, 51, 60 must be operated in a specified order. Users experienced in the operation of audio device can preset relatively easily, whereas inexperienced users have difficulties in this operation.

Furthermore, inexperienced users may be confused if the tuner block 89 is not operated at all when simple operation mode is started up with no receiving channel preset.

If, as in this embodiment, the button 49 or 50 is operated to make the receiving frequency variable when the preset is not executed, even inexperienced users can visually check symbols on the operation buttons 49 and 50 to operate these operation buttons 49 and 50. In this case, receiving frequency displayed in the display unit 45 is changing, so that inexperienced users can select a desired reception frequency by operating the operation button 49 or 50.

Thus, with this audio device 1, inexperienced users can select a radio broadcast easily.

When power is turned on in simple operation mode, the control circuit 67 lights the tuner select and receiving band operation button 48 and the simple operation button 62 in orange.

In this embodiment, similar to the operation buttons 7 and 25, the operation button 48 has a light-emitting diode L3 in the upper left corner. The light-emitting diode L3 is composed of light-emitting diode chips 91 and 92 with orange and green luminescent colors stored respectively.

The simple operation button 62 has a long and narrow window in which an orange light-emitting diode L4 is located.

When the operation button 48 is ready to start up the tuner, the control circuit 67 drives the orange light-emitting diode chip 91 to light the operation button 48 in orange. Whereas, once the tuner block 89 has started operation through operation of the operation button 48, the control circuit 67 drives the green light-emitting diode chip 92 instead of the orange light-emitting diode chip 91 to light display the operation button 48 in green.

Regarding the tuner and amplifier unit 4, thus inexperienced users can select and operate the operation button 48 easily, so that usability can be improved.

In addition, in the audio device 1, the display of the light-emitting diode L3 is switched as in the operation buttons 7 and 25, so that, when the simple operation button 62 is operated to turn power on, basic action operation buttons 7, 25, 48 to be operated immediately are displayed uniformly. Therefore, user can identify these kind of operation buttons easily.

Hence, inexperienced users can operate easily and overall usability of the audio device 1 can be improved.

The simple operation button 62 is allocated next to the power switch 61, and has a long and narrow window through which the light-emitting diode L4 irradiates light, so that the user can clearly distinguish the difference from the operation buttons 7, 25, 48. Thus, user can set the simple operation mode easily without referencing an instruction manual, thereby usability can be improved.

The control circuit 67 drives the light-emitting diode chip 91 to blink in orange for a specified period immediately right after the power is turned on in simple operation mode. Soon after that tuning the power on to the overall audio device 1, basic action operation buttons 7, 25, 48 which can be immediately operated blinks uniformly so as to be identified easily, so that overall usability for inexperienced users can be improved easily.

In this power-starting operation, when the user operates the operation buttons 61 or 62 with timer recording set, the control circuit 67 displays in the display unit 45 a message which shows timer recording is set, and then terminates the processing without turning power on.

That is, if the power is to turn on although timer recording has been set, the user may set timer recording in such a manner that it overlaps with the current recording time, or to change the current recording conditions, further to replace the cassette tape put into.

Hence, the control circuit 67 avoids accepting operation of the power switch 61 and the operation button 62 only while timer recording is set, thereby valuable opportunities for recording cannot be missed.

Figure 7:
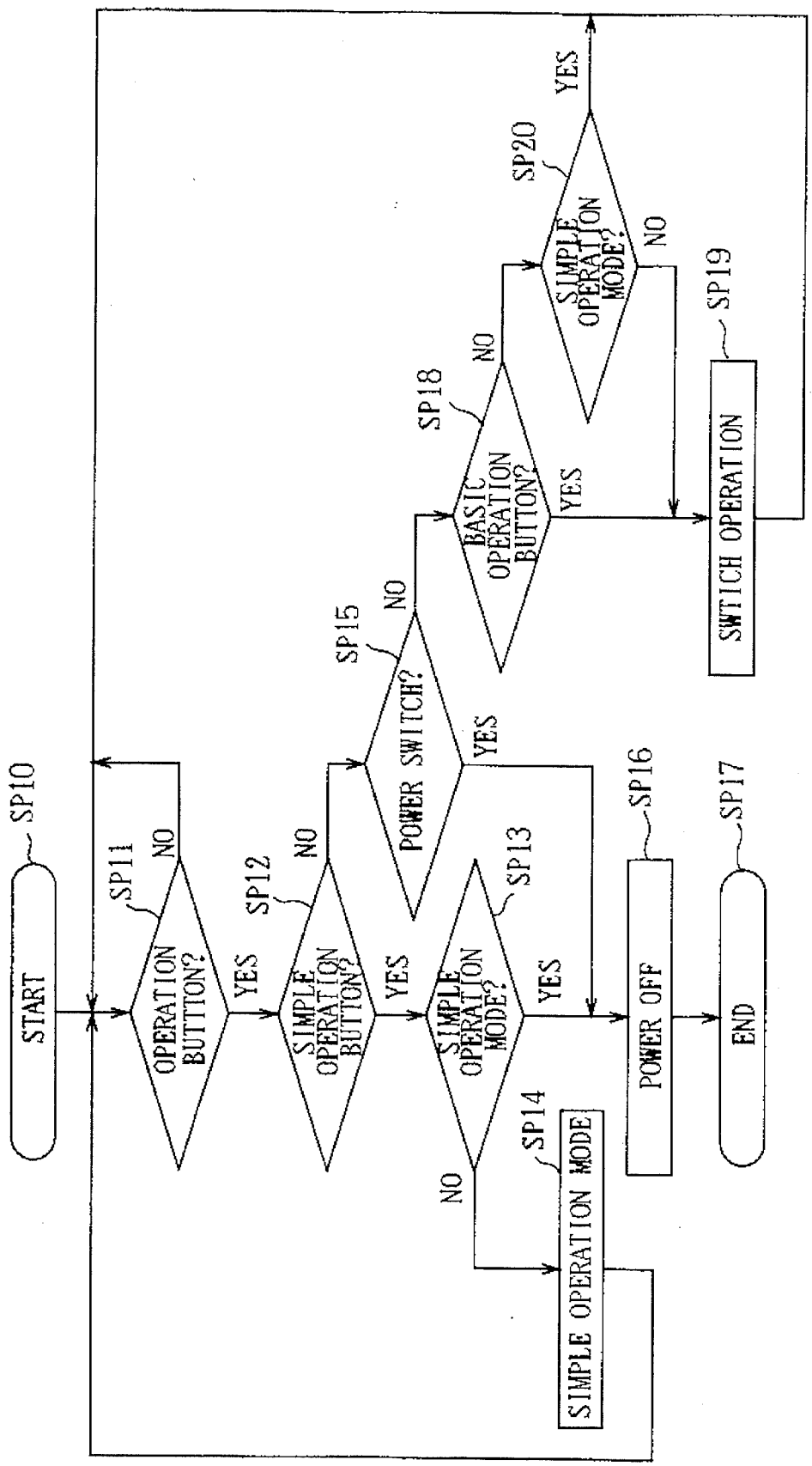
FIG. 7 is a flowchart explaining the switching of operation mode.

When power is turned on in this manner, the control circuit 67 executes the processing shown in FIG. 7 to switch overall operation.

More specifically, the control circuit 67 proceeds from step SP10 to SP11. It is determined here that whether or not any operation button has been pressed. If negative result is obtained, the control circuit 67 repeats step SP11.

On the contrary, in the case where any button has been pressed, the result of step SP11 is affirmative, and the control circuit 67 proceeds to step SP12. It is determined here that whether or not the operated operation button is the simple operation button 62 or the simple operation button of the remote commander.

If the affirmative result is obtained at step SP12, the system control circuit 67 proceeds to step SP13 to determine whether or not simple operation mode has already been set.

In the case where the audio device 1 has been set to normal operation mode, the result of step SP13 is negative, and the control circuit 67 proceeds to step SP14 to switch overall operation mode to simple operation mode.

In the control circuit 67, the operation status data is stored in memory 93, 96 similar to the simple operation button 62 being pressed to turn power on, and also in the control circuits 65 and 66, data showing operation status is written in memory 73 and 83. Therefore, the operation status for simple operation mode recorded in memory 74, 84, 94, and 97 is reproduced.

The control circuit 67 further switches the light-emitting diodes L1 to L3 to blink in orange, and switches the blinking display to continuous display after a specified length of time, and further lights the light-emitting diode L4 of the operation button 62.

Therefore, the audio device 1 can switch overall operation mode to simple operation mode even after the power switch 61 is operated to turn power on.

That is, even users inexperienced in operation of audio equipment can identify the power switch 61 easily. Since the simple operation button 62 is next to the power switch 61, the user can operate the operation button 62, and the power switch 61, and then the button 62 again.

In this embodiment, operation of the operation button 62 can switch to simple operation mode under any conditions, so that, if an inexperienced user operates the operation button 62 as he thinks fit, it can switch overall operation mode to simple operation mode. Therefore, the usability of the audio device 1 can be improved.

When operation mode is switched to simple operation mode in this manner, the control circuit 67 invalidates sleep mode if this mode has been selected by the user.

Sleep mode is set, for example, before the user goes to bed, and the power is turned off after a specified length of time. Thus, if the simple operation button 62 is operated while sleep mode is set, another user differing from the user who has set sleep mode may be trying to operate the operation button 62.

If the operation mode is switched to simple operation mode with sleep mode retained, the power is turned off after a specified length of time. Thereby, the user who has selected simple operation mode may be confused.

The control circuit 67 thus invalidates the selection of sleep mode, so that inexperienced users can operate with confidence.

When the operation mode is switched to simple operation mode in this manner, the control circuit 67 returns to step SP11 to wait for subsequent operation of a operation button.

On the other hand, in the case where the simple operation button 62 is pressed with simple operation mode set, if the affirmative result is obtained at step SP13, the control circuit 67 thus proceeds to step SP16 to turn the power off similar to the power switch 61 being pressed, and then proceeds to step SP17 to terminate the process.

If the power is turned on by operation of the simple operation button 62, the user may then operate the operation button 62 to turn the power off.

The audio device 1 thus turns power off when the simple operation button 62 is operated again with simple operation mode set. Thereby, the users inexperienced in operation can turn power off easily.

When the control circuit 67 turns power off, it also switches operation mode to normal operation mode. Consequently, when the power switch 61 is operated to turn power on, the power can be turned on in normal operation mode.

On the other hand, if an operation button other than the operation button 62 is operated, the control circuit 67 proceeds to step SP12 because the result of step SP12 is negative, and then the circuit 67 proceeds to step SP15.

The control circuit 67 determines whether or not the operated button is the power switch 61 at step SP15. If affirmative result is obtained here, the control circuit 67 proceeds to step SP16 regardless of the operation mode to turn power off.

In both cases where the operation button 62 is operated to switch to simple operation mode after operating the power switch 61 to turn power on, or the operation button 62 is directly operated to turn power on in simple operation mode, the user may operate the operation button 61 to turn power off.

In contrast with turning power on, the audio device 1 thus turns the power off based on operation of the power switch 61 regardless of the operation mode. Therefore, the power can be turned off easily and the usability of the audio device 1 can be improved.

In this case, if simple operation mode is retained, the control circuit 67 turns power off on the condition that overall operation mode is switched to normal operation mode, similar to the operation button 62 being operated to turn power off.

If the operation button operated by the user differs from the power switch 61 or the operation button 62, the negative result is obtained at step SP15, the control circuit 67 thus proceeds to step SP18.

The control circuit 67 then determines whether or not the operated operation button is a basic action operation button at step SP18. If an affirmative result is obtained, the circuit 67 proceeds to step SP 19 to switch the operation of the overall audio device 1 corresponding to the operated button.

If the operation button 7, 25, or 48 is operated with simple operation mode set, the control circuit 67 switches the light-emitting diodes L1 to L3 for the operated button to light in green and the remaining diodes L1 to L3 to light in orange.

In the audio device 1, operable basic action operation buttons are formed enlarged, thereby difference from the additional function operation buttons can be easily distinguished. Further, among operable basic action operation buttons, the operated button can be distinguished easily from the other operation buttons. Hence, inexperienced users can operate the device 1 easily.

The control circuit 67 switches operation in response to the users operation, and then returns to step SP11 to wait for subsequent operation of a operation button.

On the contrary, if the user operates an additional function operation button, the result of step SP18 is negative, so that the control circuit 67 proceeds to step SP20 to determine whether or not simple operation mode has been set.

If the user has selected simple operation mode, the result of step SP20 is affirmative, so that the control circuit 67 returns to step SP11 without responding to any operation of a operation button to wait for subsequent operation of a operation button.

Once simple operation mode is set, the audio device 1 only accepts operation of basic action operation buttons. Therefore, operation of additional functions that may confuse inexperienced users are not accepted.

On the other hand, if the user operates an additional function operation button during normal operation mode, the negative result is obtained at step SP20, so that the control circuit 67 proceeds to step SP19 to control overall operation based on the button operated.

The audio device 1 allows experienced users such as audiophiles to use various additional functions freely, thereby providing sufficient usability to satisfy such users.

The audio device 1 therefore provides usability for both experienced and inexperienced users. Hence, for example, a mother and her child can share a single audio device satisfactorily.

With the above configuration, since simple operation mode is started up in response to operation of the simple operation button 62 and only operation of basic action operation buttons can be accepted, inexperienced users can use simple operation mode to operate the device easily. Further, audiophiles can use the audio device 1 in normal operation mode to obtain sufficient usability.

In addition, operation status data is recorded in memory in the simple or normal operation mode, and operation status is reproduced in the simple or normal operation mode, so that, if an experienced and an inexperienced user share the audio device 1, each of them can use the device 1 without disturbing the operation status set by the other. As a result, usability can be improved.

Furthermore, in the simple operation mode, inexperienced users can operate the device easily because adjustment items such as effects are set to preset initial values and operable buttons light.

In the embodiment described above, the operation buttons are allocated on the remote commander similar to those of the audio device 1, and light-emitting diodes that can light are allocated in those of the former buttons that correspond to the operation buttons 7, 25, 48, 62. However, this invention is not only limited to this, but light-emitting diodes of the remote commander can be omitted.

Furthermore, in the above embodiment, the operation buttons 7, 25, 48 and 62 can be lighted. However, this invention is not only limited to this, but those other than the above operation buttons can have light-emitting diodes that light, and users can then check operable buttons visually.

Furthermore, in the embodiment described above, the presence of a compact disc is detected based on the result of a focus search. However, this invention is not only limited to this, but the presence of a disc can be detected by detection of whether or not TOC data composed of management data can be reproduced. Further, various other detection means are applicable to detection of the presence of a disc.

Furthermore, in the embodiment described above, the switch allocated on the front panel detects the presence of a tape cassette. However, this invention is not only limited to this, but various tape cassette detection methods are applicable, such as a method based on the driving results of a reel motor..

Furthermore, in the embodiment described above, this invention is applied to an audio device composed of a disc unit, a tape recorder unit, and a tuner and amplifier unit. However, this invention is not only limited to this, but is applicable to audio devices integrated with a digital audio tape recorder, and an optical magnetic disc device. Further, it can be applied to single function audio devices such as compact disc player and a cassette deck.

Furthermore, this invention is not only limited to an audio equipment, but is applicable to image equipment such as a video tape recorder.

While there has been described in connection with the preferred embodiments of the invention, it will be obvious to those skilled in the art that various changes and modifications may be aimed, therefore, to cover in the appended claims all such changes and modifications as fall with the true spirit and scope of the invention.

What is claimed is:

1. An electronic equipment, comprising:
   a plurality of operation buttons including basic action operation buttons operable to control basic operations of said electronic equipment, additional function operation buttons operable to control operations in addition to said basic operations, and a mode switching button; and control means for switching overall operation of said electronic equipment in response to the operation of said basic action operation buttons and said additional function operation buttons when a normal operation mode is selected, such that when said mode switching button is operated to change over the operation mode to a simple operation mode, only said basic action operation buttons are operable and said additional function operation buttons are rendered inoperable.

2. The electronic equipment according to claim 1, wherein said control means includes a control circuit for enabling said basic operation buttons, to carry out recording and reproduction operations and for disabling said additional function operation buttons when said simple operation mode is selected by said mode switching button.

3. The electronic equipment according to claim 2, wherein said control circuit turns power on and switches the operation mode to said simple operation mode when said mode switching button is operated at a power-off condition.

4. An electronic equipment, comprising:

a plurality of operation buttons including basic action operation buttons operable to control basic operations of said electronic equipment, additional function operation buttons operable to control operations in addition to said basic operations, and a mode switching button; and control means for switching overall operation of said electronic equipment in response to the operation of said basic action operation buttons and said additional function operation buttons when a normal operation mode is selected, such that when said mode switching button is operated to change over the operation mode to a simple operation mode, only said basic action operation buttons are operable and said additional function operation buttons are rendered inoperable, said control means including first and second memories, said first memory being operable to store operation settings of said additional function and said basic action operation buttons established by a user during said normal operation mode, and said second memory being operable to store simple operation settings of said basic action operation buttons and predetermined initial settings of said additional function operation buttons established by a user during said simple operation mode, said control means being operable to set overall operation of said electronic equipment in accordance with said operation settings stored in said first memory when power is turned on in said normal operation mode, and to set overall operation of said electronic equipment in accordance with said simple operation settings stored in said second memory when the operation mode is switched to said simple operation mode or when power is turned on in said simple operation mode.

5. The electronic equipment according to claim 4, further comprising an amplifier unit having an adjustable volume for amplifying audio signals to be supplied to a speaker device, and wherein said basic action operation buttons include a button operable for adjusting the volume of reproduced sound outputted from said speaker device.

6. The electronic equipment according to claim 5, wherein said control means further includes a control circuit to set the volume of said reproduced sound in response to operation of a volume operation button, said control means being operable to store in said first memory, the volume setting derived from said volume operation button in said normal operation mode, and to store in said second memory, the volume setting derived from said volume operation button in said simple operation mode, said control means being further operable to set the volume of said reproduced sound based on said volume setting stored in said first memory when power is turned on in said normal operation mode, and to set the volume of said reproduced sound based on said volume setting stored in said second memory when power is turned on in said simple operation mode.

7. The electronic equipment according to claim 2, further including a reproducing unit for reproducing audio signals recorded on a disc-shaped recording medium, and said basic action operation buttons include playback, pause, and stop operation buttons for starting, pausing, and stopping reproduction of audio signals recorded on said disc-shaped recording medium, respectively, and an eject operation button for ejecting and loading said disc-shaped recording medium onto said reproducing unit.

8. The electronic equipment according to claim 7, wherein said reproducing unit includes detection means for detecting the presence of said disc-shaped recording medium, and said control circuit is operable to cause a tray to move to convey said disc-shaped recording medium loaded on said tray from a reproducing position to a replaceable position when said eject operation button is operated, to start reproduction of said disc-shaped recording medium when said playback operation button is operated if said disc-shaped recording medium is detected as being present, and to cause said tray to move to said replaceable position when said playback operation button is operated but said disc-shaped recording medium is detected as not being present.

9. The electronic equipment according to claim 8, wherein said reproducing unit further includes an optical pickup for irradiating a light beam to said disc-shaped recording medium via an object lens and receiving a reflected light beam from said disc-shaped recording medium via said object lens to produce an output signal, a signal processing circuit for modulating said output signal from said optical pickup thereby reproducing an audio signal recorded on said disc-shaped recording medium, and a focus search circuit for focusing said object lens while monitoring said reflected light beam when said disc-like recording medium is present; and wherein said detection means determines that said disc-shaped recording medium is not present when said focus search circuit cannot retain said object lens in a position where said irradiating light beam collects properly on a data recording surface of said recording medium.

10. The electronic equipment according to claim 8, wherein said disc-shaped recording medium includes inner and outer circumference areas with audio signals on said outer circumference area and management information of said audio signals on said inner circumference area; said reproducing unit being operable to reproduce said management information before reproducing said audio signals, and then to reproduce said audio signals based on the reproduced management information; and wherein said detection means determines that said disc-shaped recording medium is not present when said reproducing unit cannot reproduce said management information.

11. The electronic equipment according to claim 2, further including a magnetic recording and reproducing unit for recording audio signals on a magnetic tape stored in a tape cassette and for reproducing audio signals from said magnetic tape; and wherein said basic action operation buttons include playback and stop operation buttons for starting and stopping reproduction of said magnetic tape, respectively, an eject operation button for ejecting said tape cassette, and fast-forward and rewind operation buttons for fast-forwarding and rewinding said magnetic tape, respectively.

12. The electronic equipment according to claim 11, wherein said magnetic recording and reproducing unit includes cassette detection means for detecting the presence of said tape cassette and a moveable cassette holder; and wherein said control circuit is operable to move said tape cassette retained in the cassette holder from a reproducing position to a replaceable position when said eject operation button is operated, to start playing said tape cassette when said playback operation button is operated if said tape cassette is detected as being present, and to move said cassette holder to said replaceable position when said playback button is operated if said tape cassette is detected as not being present.

13. The electronic equipment according to claim 2, further including a receiving unit for tuning to radio broadcasts, and said basic action operation buttons include operation buttons to select a radio broadcast.

14. The electronic equipment according to claim 1, further comprising an amplifier unit having an adjustable volume for amplifying audio signals to be supplied to a speaker device, and said basic action operation buttons include a button operable for adjusting the volume of reproduced sound outputted from said speaker device.

15. A method for controlling electronic equipment which comprises a reproducing unit for reproducing audio signals, a recording unit for recording audio signals, an input unit for receiving inputs from a plurality of operation buttons including basic action operation buttons operable to control basic operations of said electronic equipment, additional function operation buttons operable to control operations in addition to said basic operations, and a mode switching button operable to establish normal and simple operation modes, and a control unit for controlling reproducing operations of said reproducing unit and recording operations of said recording unit, said method comprising the steps of:

controlling said reproducing and said recording operations based on operation inputs from a plurality of operation buttons including said basic action and said additional function operations buttons in said normal operation mode; and controlling said reproducing and said recording operations based only on operation inputs from said basic action operation buttons when said simple operation mode is selected by said mode switching button, and rendering said additional function operation buttons inoperable when said mode switching button is operated to change over the operation mode to said simple operation mode.

16. A method for controlling electronic equipment which comprises a reproducing unit for reproducing audio signals, an input unit for receiving inputs from a plurality of operation buttons including basic action operation buttons operable to control basic operations of said electronic equipment, additional function operation buttons operable to control operations in addition to said basic operations, and a mode switching button operable to establish normal and simple operation modes, and a control unit for controlling reproducing operations of said reproducing unit, said method comprising the steps of:

controlling said reproducing operations based on operation inputs from a plurality of operation buttons including said basic action and said additional function operation buttons in said normal operation mode;

controlling said reproducing operations based only on operation inputs from said basic action operation buttons when said simple operation mode is selected by said mode switching button, and rendering said additional function operation buttons inoperable;

memorizing said operation inputs from said basic action and said additional function operation buttons in a first memory of said electronic equipment;

memorizing said operation inputs from said basic action operation buttons in a second memory of said electronic equipment; and controlling said reproducing unit and recording unit based on said operation inputs from said second memory in said simple operation mode.

17. The method of claim 16, further comprising the steps of controlling said reproducing unit and said recording unit based on said normal operation inputs from said first memory in said normal operation mode.

18. The electronic equipment according to claim 13, wherein said operation buttons to select a radio broadcast include first and second operation buttons; said additional function operation buttons include a preset/tuner mode switching button to toggle between preset and tuner search mode for selecting receiving channels in said normal operation mode; and wherein said control circuit further comprises means for presetting receiving channels selected by the user; means responsive to said first and second operation buttons for selecting among said preset receiving channels in said normal operation mode when said preset/tuner mode switching button is operated to establish said preset mode;

means for sequentially tuning to different receiving frequencies to search for a radio broadcast in response to said operation of said first or said second operation buttons in said normal operation mode when said preset/tuner mode switching button is operated to establish said tuner search mode;

means responsive to said first and second operation buttons for selecting among said preset receiving channels in said simple operation mode if said receiving channels have been preset; and means for sequentially tuning to different receiving frequencies to search for a radio broadcast in response to said operation of said first or said second operation buttons in said simple operation mode if said receiving channels have not been preset.

19. The method of claim 15, further comprising the steps of setting a delay power on mode to set a time when said electronic equipment powers on; setting a delay power off mode to set a time when said electronic equipment powers off; and canceling said delay power on or off mode settings when said mode switching button is operated to establish said simple operation mode.

20. The method of claim 15, wherein said recording unit includes a recording timer; and further comprising the steps of rendering said mode switching button inoperable if said recording timer has been previously set to record signals at a specified time.

21. The method of claim 15, further comprising the steps of changing over the operation mode to said normal operation mode when said electronic equipment is turned off in said simple operation mode.

22. The method of claim 15, further comprising the steps of illuminating only the basic action operation buttons when said mode switching button is operated to establish said simple operation mode.

* * * * *